United States Patent [19]
Fragnito

[11] Patent Number: 6,044,722
[45] Date of Patent: Apr. 4, 2000

[54] VARIABLE TORQUE TRANSMISSION

[76] Inventor: Frank A. Fragnito, 11 Holmes Ave., North Babylon, N.Y. 11703

[21] Appl. No.: 09/281,131

[22] Filed: Mar. 29, 1999

[51] Int. Cl.[7] ....................................................... F16H 3/22
[52] U.S. Cl. ............................................... 74/351; 74/416
[58] Field of Search ............................ 74/351, 416, 117; 475/169, 170, 190, 191, 193, 197, 336

[56] References Cited

U.S. PATENT DOCUMENTS

| | | | |
|---|---|---|---|
| 536,550 | 3/1895 | Snyder | 74/351 X |
| 541,251 | 6/1895 | Rice | 74/351 |
| 542,095 | 7/1895 | Muehleisen | 74/351 |
| 619,551 | 2/1899 | Ferris | 74/351 |
| 684,215 | 10/1901 | Foster | 74/351 |
| 955,279 | 4/1910 | Moore | 74/351 |
| 978,877 | 12/1910 | Grimes | 74/351 |
| 1,164,481 | 12/1915 | Dial | 74/351 |
| 1,316,427 | 9/1919 | Cook | 74/351 |
| 2,473,545 | 6/1949 | Reid | 74/351 |
| 2,749,764 | 6/1956 | Chou | 74/416 X |
| 2,870,644 | 1/1959 | Winter | 74/351 |
| 3,075,397 | 1/1963 | Winter | 74/351 X |
| 3,872,736 | 3/1975 | Houvouras | 74/416 X |
| 4,019,405 | 4/1977 | Winter | 74/344 |
| 4,447,068 | 5/1984 | Brooks | 74/351 X |
| 4,875,389 | 10/1989 | Fragnito . | |
| 4,896,543 | 1/1990 | Gullman . | |
| 5,065,638 | 11/1991 | Barens | 74/351 |
| 5,222,405 | 6/1993 | Reynolds | 74/351 |
| 5,291,795 | 3/1994 | Hafner . | |
| 5,413,009 | 5/1995 | Fragnito . | |
| 5,413,011 | 5/1995 | Fragnito . | |
| 5,467,660 | 11/1995 | Barens | 74/351 |
| 5,747,699 | 5/1998 | Ebi . | |

FOREIGN PATENT DOCUMENTS

| | | | |
|---|---|---|---|
| 326185 | 5/1903 | France | 74/351 |

*Primary Examiner*—Charles A Marmor
*Assistant Examiner*—Scott Lund
*Attorney, Agent, or Firm*—Alfred M. Walker

[57] ABSTRACT

A variable torque transmission includes at least one disc-shaped gear 30 having a circular toothed surface 36 with flat beveled teeth 32 that mate along radius 38 with the cone-shaped teeth of pinion gear 10 to produce an infinitely variable lever arm and thus infinitely variable torque while allowing a constant rotation ratio between the drive shafts of the flat beveled gear 30 and pinion gear 10. The result is that the drive shaft energy input may be constant and thus energy efficiency may be maximized while torque may be selectively varied.

4 Claims, 4 Drawing Sheets

VARIABLE TORQUE TRANSMISSION

FIELD OF THE INVENTION

The present invention relates to infinitely variable transmissions for driving motors.

BACKGROUND OF THE INVENTION

Infinitely variable transmissions are known, such as disclosed in Applicant's prior U.S. Pat. No. 5,413,009 for an infinitely variable transmission wherein a plurality of pins engage ruffled disc-shaped gears and in Applicant's other U.S. Pat. Nos. 4,875,389 for a chain-driven infinitely variable speed transmission and 5,413,011 for a positive variable speed transmission.

Other prior art include that described in U.S. Pat. Nos. 4,896,543 of Gullman for a force measurement assembly for writing stylus', 5,291,795 of Hafner for a transmission using elastomeric materials and 5,747,699 of Ebi for a method of measuring torsional stresses.

However, none of the prior art devices properly apply torque to variable transmissions.

OBJECT OF THE INVENTION

It is therefore an object of the present invention to provide a variable transmission that applies torque.

It is also an object of the present invention to provide a transmission to produce a meshed-gear relationship between pinion teeth and other teeth of a disc-shaped gear.

It is also an object of the present invention to means for varying the torque output developed in a drive shaft of a disc-shaped gear.

It is also an object of the present invention to produce an infinitely variable, infinitely adjustable motion of a pinion along teeth of a disc-shaped gear for adjustable variation in the torque output of a drive shaft of the disc-shaped gear.

It is also an object of the present invention to improve over the disadvantages of the prior art.

SUMMARY OF THE INVENTION

In keeping with these objects and others that may become apparent, the present invention includes a variable torque transmission which uses leverage in performance.

The transmission of the present invention will have many services in the electrical cars of the near future and in many other applications, such as to power conveyor belt systems and in standard mechanical trucking transmissions, to more smoothly transmit gear changes during driving.

The torque variability of the present invention is analogous, for example, to a person pulling a nail from a board with a given hammer. In this effort, leverage is crucial. If the nail puller grabs the hammer at the end close to the bottom of the handle and pulls the nail, the lever arm is short, applied force is small, and thus the nail is extremely difficult to move. But if the nail puller then moves the pull pressure to the top of the hammer handle, the lever arm utilized is much longer, and the torque applied to the nail is much greater. The nail then moves out.

The level-arm comparison in pulling nails is analogous to the present invention, which includes a variable torque transmission, with at least one disc-shaped gear having a circular toothed surface. The disc-shaped gear has a radius and a central axis, with the central axis having drive shaft therein. The circular toothed surface of the disc shaped gear includes radially disposed flat-contoured teeth thereon.

The flat teeth of the disc shaped gear include beveled flat surfaces. These flat teeth have respective individual radial lengths.

A circular-shaped pinion includes a central axis with a drive shaft therein. This pinion has cone-shaped teeth radially projecting from the pinion's central axis.

The cone-shaped teeth of the pinion contact and engage the flat-contoured teeth of the disc-shaped gear at a variable radial point of contact within the radial length of the flat-contoured teeth, so as to produce a meshed-gear relationship between the cone-shaped pinion teeth and the flat-contoured teeth of the disc-shaped gear.

The transmission also drives the cone-toothed pinion drive shaft. Output torque is developed within the drive shaft of the disc-shaped gear, wherein the output torque is the result of input torque applied to the disc-shaped gear by the cone-toothed pinion.

There is also a means for varying the variable radial point of contact between the flat-contoured teeth of the disc-shaped gear and the cone-shaped teeth of the cone-toothed pinion, for varying the torque output developed in the drive shaft of the disc-shaped gear.

Furthermore, the circular-shaped pinion is preferably mounted within a movable housing which produces an infinitely variable, infinitely adjustable motion of the cone-toothed pinion along the respective individual radial lengths of the flat-contoured teeth of the disc-shaped gear.

The infinitely variable motion of the cone-toothed pinion produces infinitely variable and infinitely adjustable variation in the torque output of the drive shaft of the disc-shaped gear. The movable pinion housing preferably has a pinion spindle, pinion drive gear and a pinion driveshaft, and also includes the movable housing having a driveshaft aperture therethrough for passing the pinion driveshaft through the housing and into contact with the pinion drive gear.

The variable radial point of contact is varied by an adjustable hinged lever attached to the movable pinion housing. The variation of the radial point of contact for selectable, infinitely adjustable variation in torque output from the drive shaft of the disc gear occurs by means of varying the point of contact along the radial lengths of the aforementioned flat teeth, wherein the contact is between the cone-shaped teeth of the cone-toothed pinion and the flat-contoured teeth of the disc-shaped gear.

This spindle of the cone-toothed gear is in a substantially perpendicular relationship to the torque output drive shaft of the disk gear.

DESCRIPTION OF THE DRAWINGS

The present invention can best be understood in conjunction with the accompanying drawings, in which.

DETAILED DESCRIPTION OF THE PREFERRED EMBODIMENTS

The present invention is a variable torque transmission, and it is not a variable speed transmission. The present invention transmits the torque of a given power source, permitting that power source to put out its maximum torque without variation, thereby maximizing the efficiency of energy supplied to the power source.

For example, an electric motor as a power source used to drive the variable torque transmission of the present invention will put out its maximum power at all times, while the torque derived from the motor may be varied by use of the present invention, without changing the electric drive motor's incoming electrical current in any way whatsoever.

In the present invention, the variation of torque is accomplished by a leverage change, as shown in FIGS. 1, 2, 3 and 4 of the drawings. There is no change in the speed of any of the working shafts, and therefore the rotation ratio of one shaft to the others remains constant. It is due to this effect that constant energy may be applied by the power source, and this constancy maximizes the efficiency of input energy. It is the torque that may be selectively varied by movement of hinged levers 50 as shown in FIGS. 1, 2, 3 and 4.

The four drawing FIGS. 1–4 show principal working arts and how they relate to and cooperate with one another. For example, the parts include: a flat beveled gear (30), a cone toothed pinion gear having pinion 10 with cone-shaped teeth 12.

Figure 1:
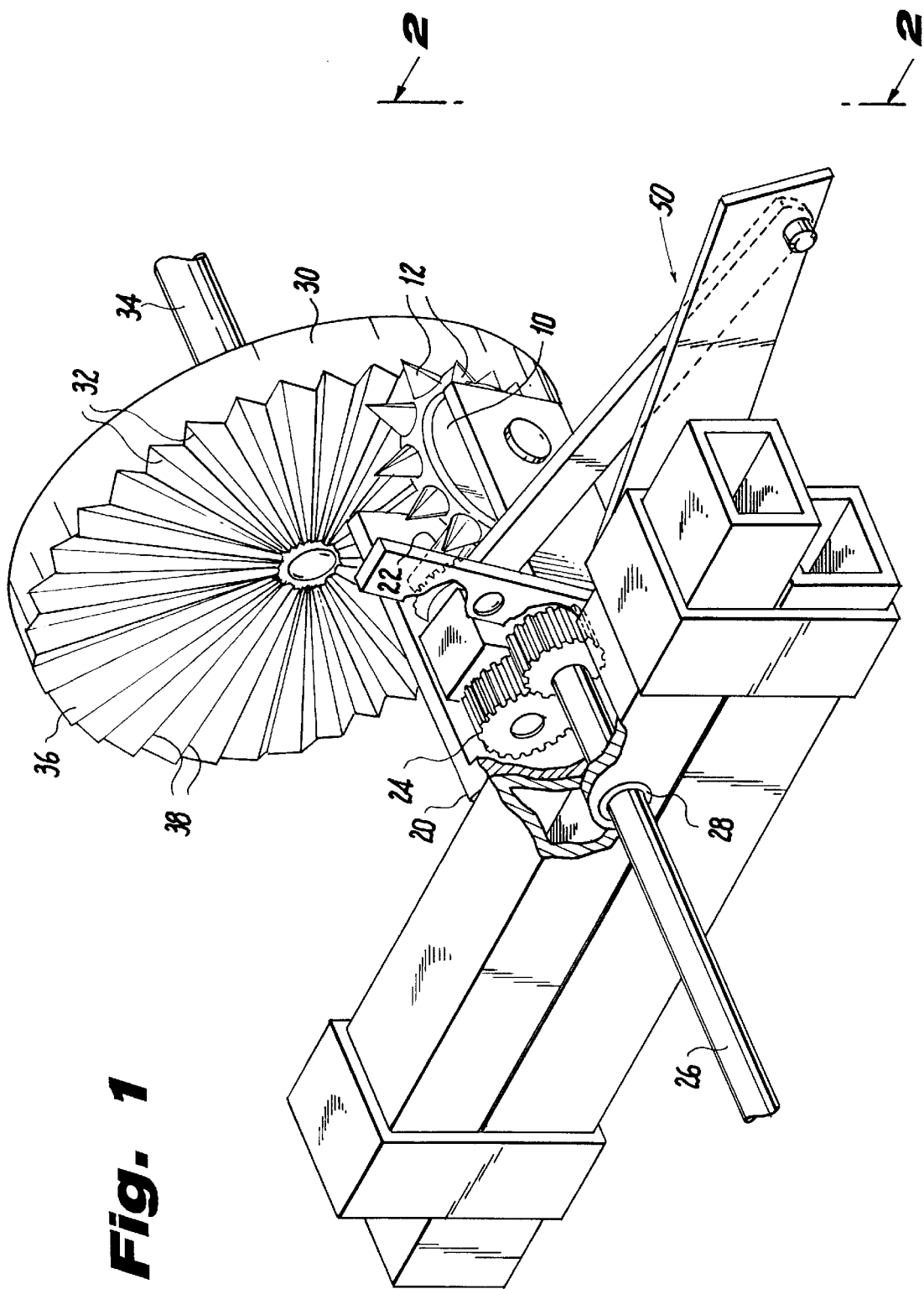
FIG. 1 is a perspective view of the present invention.

FIG. 1 shows a perspective view with face of flat beveled gear 30 having a circular toothed surface 36; wherein disc-shaped gear 30 has a radius and a central axis. Its central axis has drive shaft 34 therein and circular toothed surface 36 includes radially disposed flat-contoured teeth 32 thereon. Flat teeth 32 include beveled flat surfaces, wherein flat teeth 32 have respective individual radial lengths 38. As also shown in FIG. 1, the variable torque transmission of the present invention, operated at constant speed, includes flat beveled gear 30 is disc shaped and has a predetermined radius extending from a central axis therein toward an outer circumference thereof. The plurality of flat teeth 32 including beveled flat surfaces extend continuously and extend radially outward from the central axis of the flat beveled gear 30. The respective flat contoured teeth 32 are v-shaped, each with a narrow proximal end at said central axis and a wider open distal end at said outer circumference of disc-shaped gear 30. Each said radially extending continuous flat contoured tooth 32 is contiguous with and adjacent to another radially extending continuous flat contoured tooth 32 of the contiguous plurality of radially extending continuous flat contoured teeth 32 of disc shaped gear 30.

Cooperating with beveled gear 30 is circular-shaped cone-toothed pinion gear 10 having a central axis with a pinion spindle 22 therein. Pinion gear 10 has cone-shaped teeth 12 radially projecting from its central axis.

These cone-shaped teeth 12 of pinion gear 10 contact and engage flat-contoured teeth 32 of disc-shaped gear 30 at a variable radial point of contact within radial lengths 38 of flat-contoured teeth 32 so as to produce a meshed-gear relationship between cone-shaped pinion teeth 12 of pinion gear 10 and flat-contoured teeth 32 of disc-shaped gear 30.

Circular-shaped pinion gear 10 is mounted within a movable housing 20, which housing 20 is capable of producing infinitely variable, infinitely adjustable motion of cone-toothed pinion 10 along respective individual radial lengths 32 of the flat-contoured teeth of the disc-shaped gear 30.

The infinitely variable motion of the cone-toothed pinion gear 10 produces infinitely variable and infinitely adjustable variation in the torque output of drive shaft 34 of the disc-shaped gear 30.

The movable pinion housing 20 has a pinion spindle 22; pinion drive gears 24 and a pinion driveshaft 26. Pinion driveshaft includes movable housing 20 having driveshaft aperture 28 therethrough for passing the pinion driveshaft 26 through housing 20 and into contact with smaller pinion drive gears 24.

The means for varying the radial point of contact between flat beveled gear 10 and cone-toothed pinion gear 10 includes adjustable hinged levers 50 attached to the movable pinion housing 20.

This system for varying said radial point of contact enables the present invention to offer selectable, infinitely adjustable variation in torque output from drive shaft 34 of disc gear 30 by means of varying the point of contact of cone shaped teeth 12 of pinion 10 along radial lengths 38 of flat teeth 32.

Because levers 50 are adjustable, cone toothed pinion gear 10 may contact said flat beveled gear 30 at an infinite variety of points along lengths of radii 38, producing infinitely variable and adjustable lever arm lengths and thus infinitely variable and adjustable torque, while shaft rotation ratios remain constant between cone-toothed pinion 10 and flat beveled gear 30.

In FIG. 1, cone-toothed pinion gear 10 meshes with flat beveled gear 30 at the outside of the lengths of radii 38, thereby providing the greatest torque possible within the torque variability provided by the present invention.

Figure 2:
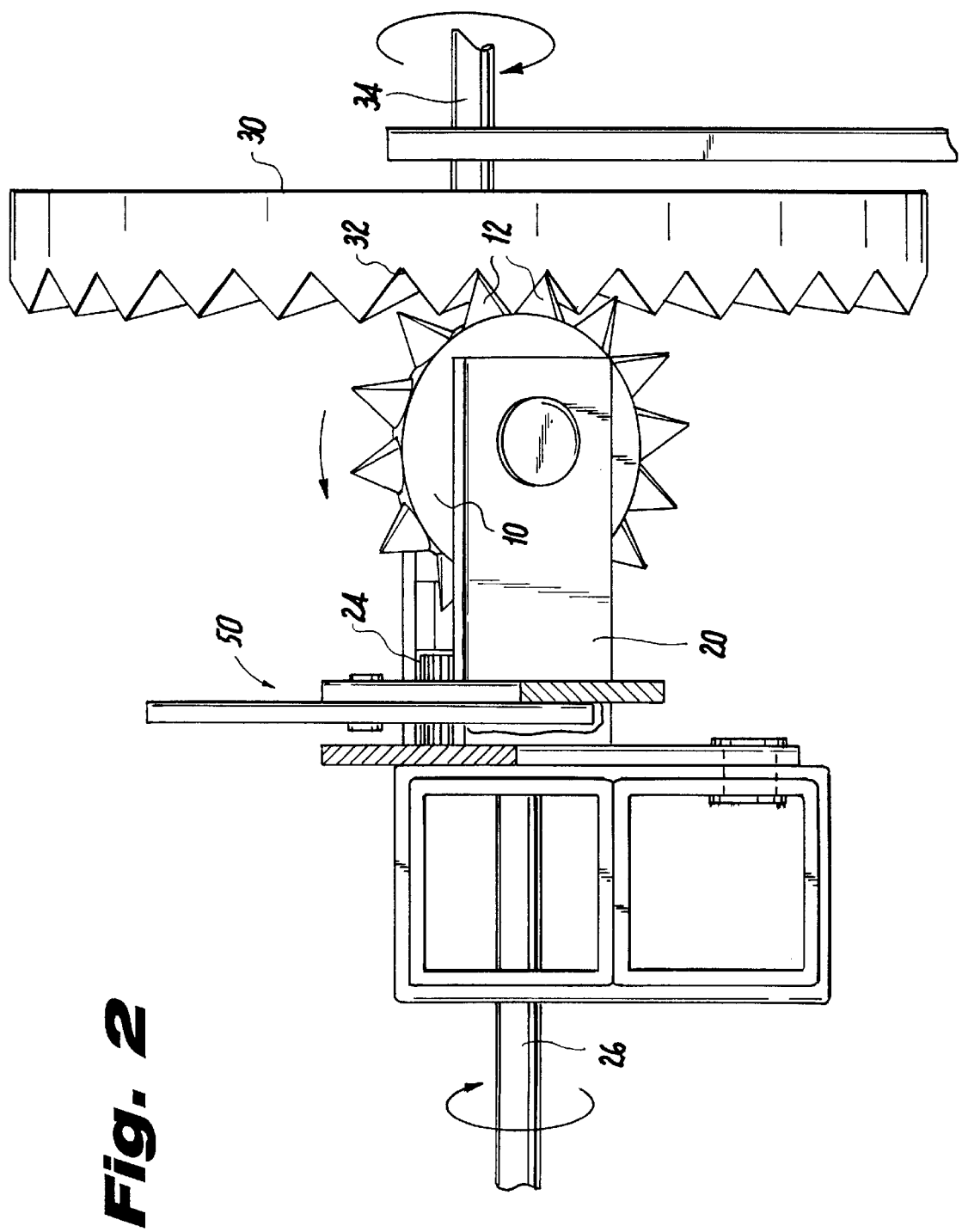
FIG. 2 is a side elevation view of the present invention.

FIG. 2 shows a side view of the invention showing drive shaft 34 of flat beveled gear 30 and drive shaft 26 geared to cone toothed pinion gear 10.

Figure 3:
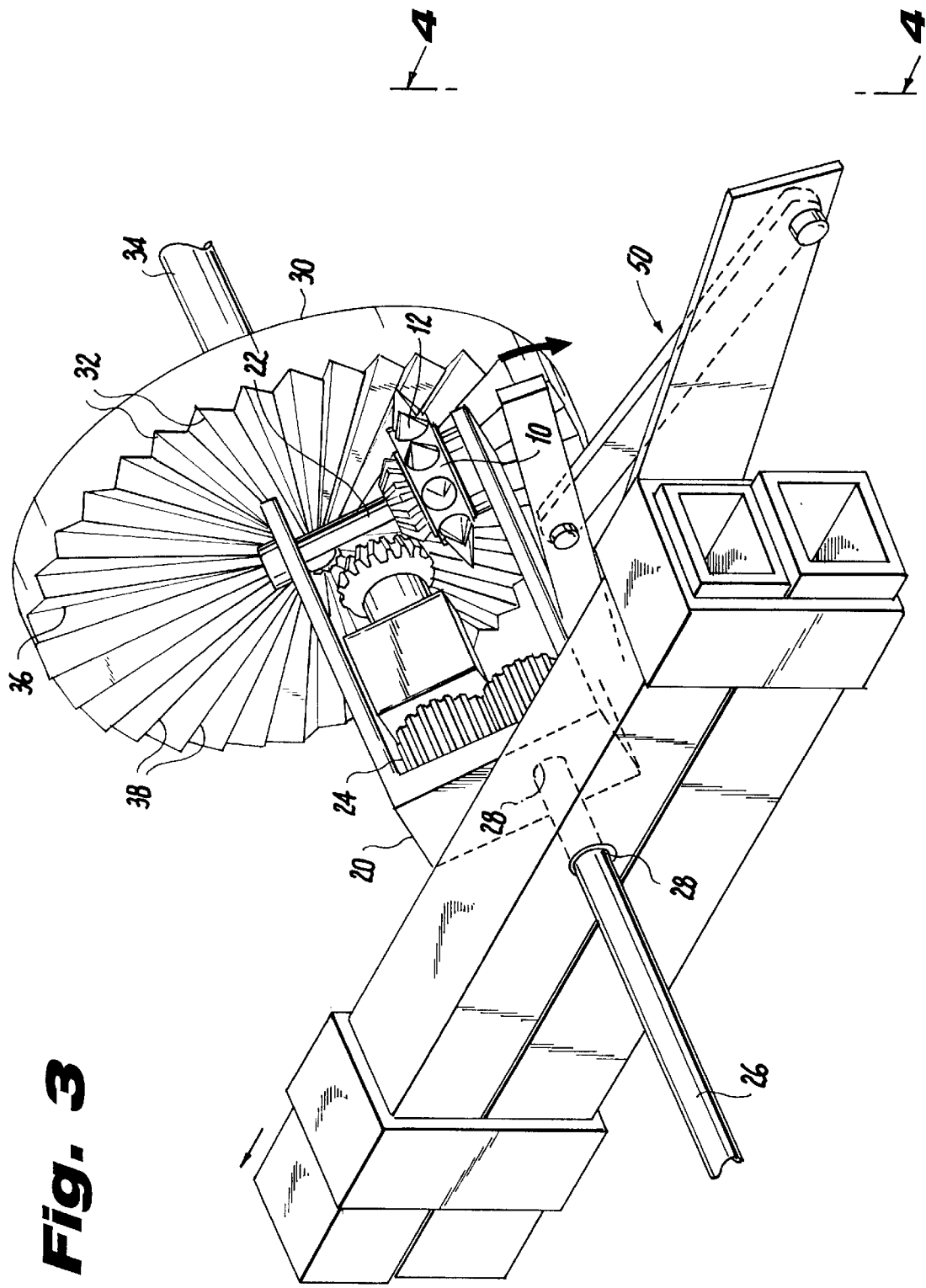
FIG. 3 is a perspective view of the present invention in an alternate torque and gear-mesh position; and, FIG. 4 is a close-up detail of the meshing of pinion gear and flat beveled gear.
Figure 4:
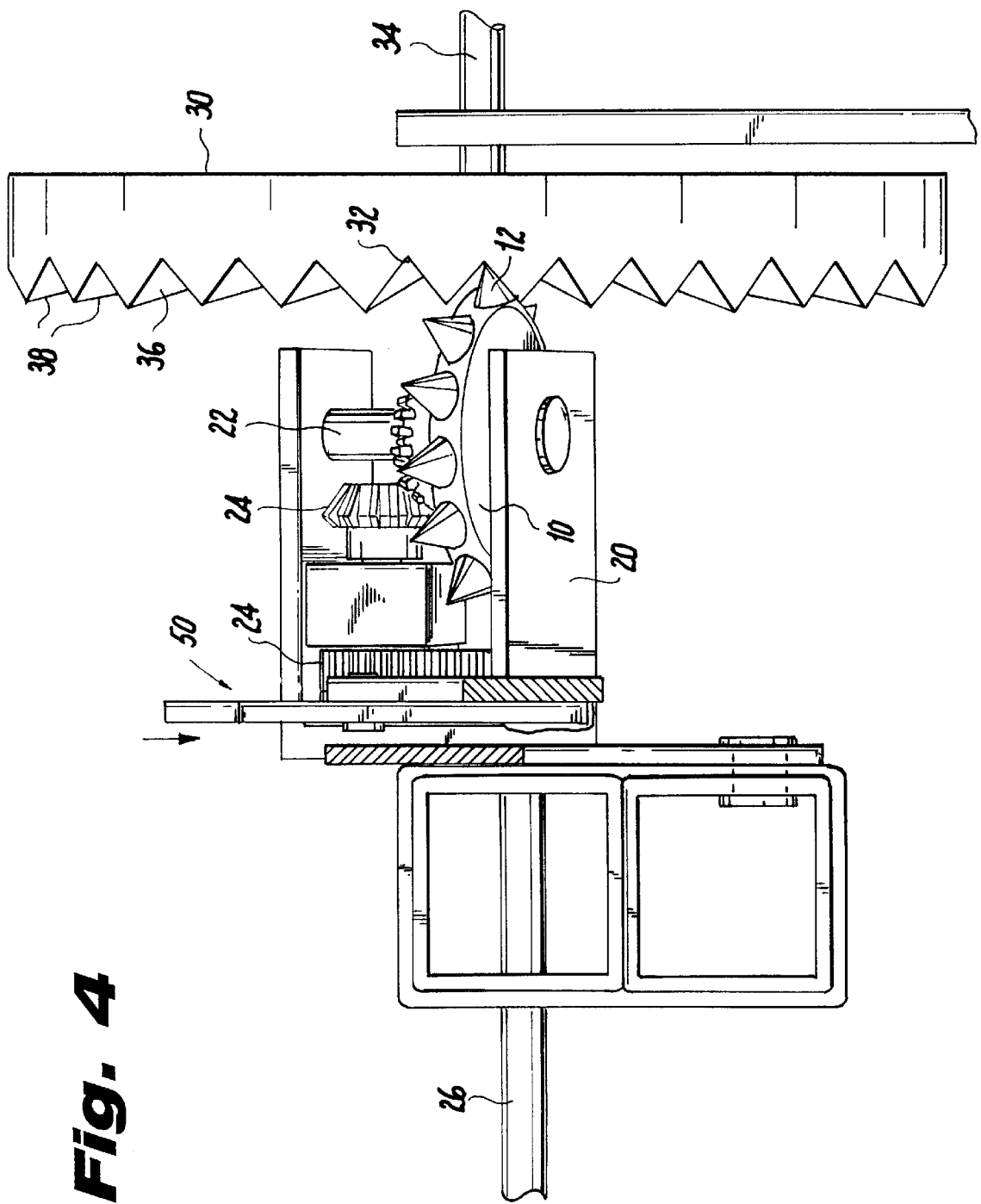

FIG. 3 shows flat beveled gear 30 meshed with cone toothed pinion 10 at an alternate location along the lengths of radii 38. FIG. 4 shows a side elevation of the present invention.

In FIG. 3, cone-toothed pinion gear 10 meshes with flat beveled gear 30 at an intermediate point along the lengths of radii 38, as compared to its position within FIG. 1, so that FIG. 3 illustrates the present invention providing an intermediate amount of torque within the torque variability provided by the present invention.

Also shown in FIG. 3 is the ability of the pinion housing 20 to tilt so as to allow cone teeth 12 of pinion gear 10 to follow the radius line 38 of flat beveled gear teeth 32, and for cone-shaped teeth 12 to always stay in contact with each mating flat beveled gear tooth 32, thus always mating with an upcoming tooth 32, one at a time. As shown, there is no difference in the speed between the shaft 34 of flat beveled gear 30 and drive shaft 26 of pinion gear 10, as there's only a one-to-one rotational ratio therebetween.

While tilting motion of housing 20 is provided as shown in FIGS. 3 and 4, spindle 22 of cone-toothed gear 10 is normally in substantially perpendicular relationship to torque output drive shaft 34 of disk gear 30.

The travel direction of the cone-toothed pinion gear 10 is therefore at an angle to flat tooth surfaces 32 of flat beveled gear 30 so as to stay in tight position with the oncoming teeth 32 of flat bevel gear 30 as the cone shaped teeth 12 of pinion gear 10 decrease and increase their respective cone-tip diameters for mating with flat bevel gear 30.

It is further known that other modifications may be made to the present invention without departing from the scope of the invention, as noted in the appended claims.

I claim:

1. A variable torque transmission, comprising:
   at least one disc-shaped gear (30) having a circular toothed surface (36); said disc-shaped gear (30) having a predetermined radius extending from a central axis toward an outer circumference of said disc-shaped gear (30), said disc-shaped gear (30) having a first drive shaft (34) secured thereto along said central axis of said disc-shaped gear (30);

said circular toothed surface (36) comprising a contiguous plurality of radially extending continuous flat-contoured teeth (32) thereon; said continuous flat-contoured teeth (32) including beveled flat surfaces extending radially outward from said central axis;

said continuous flat-contoured teeth (32) having respective continuously extending individual radial lengths (38);

said radially extending continuous flat-contoured teeth (32) having a v-shaped cross-section, with a narrow proximal end at said central axis of said disc-shaped gear (30) and a wider distal end at said outer circumference of said disc-shaped gear (30);

each radially extending continuous flat-contoured tooth (32) of said contiguous plurality of radially extending continuous flat-contoured teeth (32) being contiguous with and adjacent to another radially extending continuous flat-contoured tooth (32) of said contiguous plurality of radially extending continuous flat-contoured teeth (32);

a circular-shaped pinion (10) having a central axis and having a pinion spindle (22) therethrough along said central axis of said circular-shaped pinion (10; said pinion (10) having cone-shaped teeth (12) radially projecting from said central axis; said cone-shaped teeth (12) of said pinion (10) contacting and engaging said beveled flat surfaces of said radially extending continuous flat-contoured teeth (32) of said disc-shaped gear (30) at respective variable radial points of contact along said individual radial lengths (38) of said flat-contoured teeth (32) so as to produce a meshed-gear relationship between said cone-shaped teeth (12) of said circular-shaped pinion (10) and said radially extending continuous flat-contoured teeth (32) of said disc-shaped gear (30); and means for varying said variable radial points of contact between said flat-contoured teeth (32) of said disc-shaped gear (30) and said cone-shaped teeth (12) of said circular-shaped pinion (10) for varying output torque developed in said first drive shaft (34) of said at least one disc-shaped gear (30), said means for varying said variable radial points of contact comprising said pinion mounted within a movable housing (20) and an adjustable hinged lever means (50) attached to said movable housing (20) for varying the radial points of contact of said cone-shaped teeth of said circular-shaped pinion (10) along said individual radial lengths (38) of said continuous flat-contoured teeth of said disc-shaped gear for producing infinitely variable and infinitely adjustable variation in said output torque of said first drive shaft (34) of said at least one disc-shaped gear (30), the variable torque transmission providing means for developing output torque at constant speed within said first drive shaft (34) of said disc-shaped gear (30); said output torque being the result of input torque applied to said disc-shaped gear (30) by said circular-shaped pinion (10).

2. The variable torque transmission as in claim 1, further comprising:

said movable housing (20) supporting said pinion spindle (22);

a pinion drive gear arrangement (24) driving said circular-shaped pinion (10) and a second drive shaft (26) driving said pinion drive gear arrangement (24); and said movable housing (20) having a drive shaft aperture (28) therethrough for passing said second drive shaft (26) through said housing.

3. The transmission of claim 2, wherein:

said pinion spindle (22) of said circular-shaped pinion (10) is in a substantially perpendicular relationship to said first drive shaft (34) of said disc-shaped gear (30).

4. The transmission of claim 1, wherein:

said pinion spindle (22) of said circular-shaped pinion (10) is in a substantially perpendicular relationship to said first drive shaft (34) of said disc-shaped gear (30).

* * * * *